United States Patent Office 3,559,111
Patented Jan. 26, 1971

3,559,111

ELECTRIC WAVE MATCHING ELEMENT EMPLOYING A FERRITE PLATE CONDUCTIVELY COATED ON ONE SURFACE

Kunihiro Suetake, 11 10-ban, Minami 3-chome, Meguro-ku, Tokyo, Japan, Yoshiyuki Naito, Kawasaki-shi, and Eiji Fujiwara, Tokyo, Japan; said Naito and said Fujiwara assignors to said Suetake

Filed Sept. 10, 1969, Ser. No. 856,549
Int. Cl. H01p *1/26, 1/22*
U.S. Cl. 333—22 8 Claims

ABSTRACT OF THE DISCLOSURE

This invention pertains to a wave guide which has at least one electrical energy wave matching element disposed therein in a slanted or sloping relation with regard to the direction of wave propagation. The element, a ferrite plate, is lined with an electric conductive coating on the reverse side thereof, in the traveling direction of the electrical energy wave.

This invention relates to a wave guide and particularly to a wave guide having an electrical energy wave matching element disposed therein in slanted or inclined relation with respect to the direction of travel of said wave.

Resistance films are generally used for the damper of ultra high frequency circuits (microwave circuits), or as an attenuation element such as a matched termination. However several disadvantages, as described hereinafter, accompany the use of such resistance films. Specifically, the surface impedance, observed from one side, is effected by the reevrse side impedance. These disadvantages are overcome by the persent invention.

The invention will be more fully understood from the following description thereof and from the accompanying drawings, in which:

FIGS. 1 (A), (B) and (C) are perspective views of wave guides and coaxial cables of the prior art;

Figure 4:
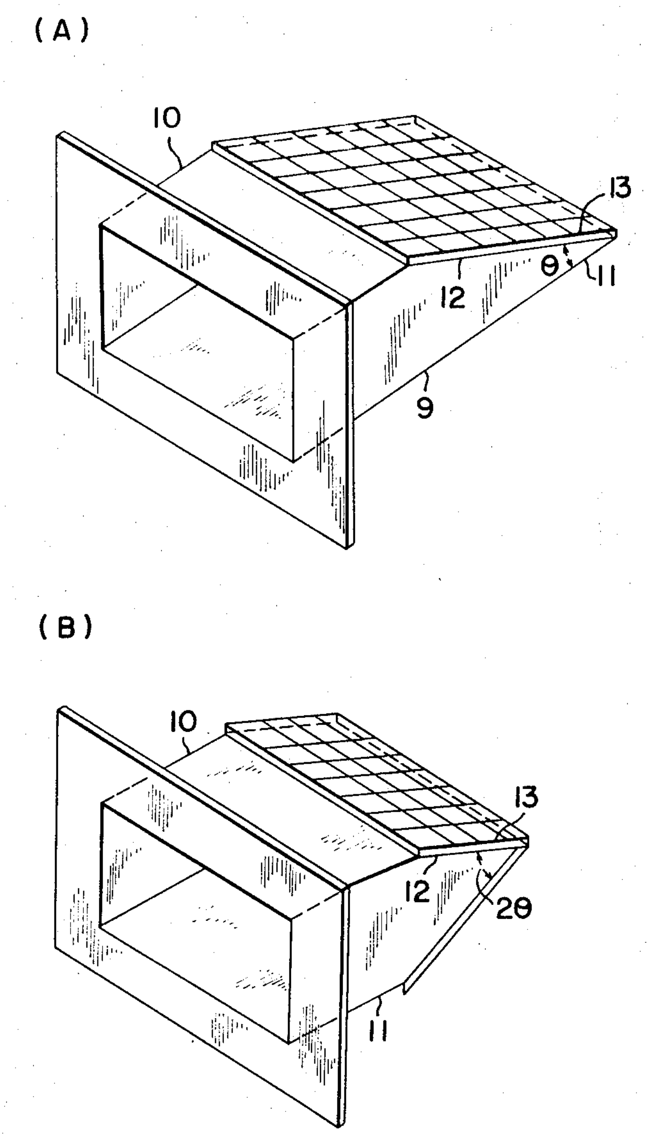
Figure 5:
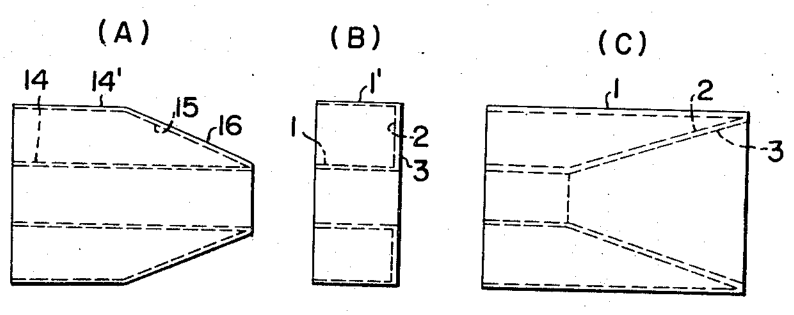
Figure 6:
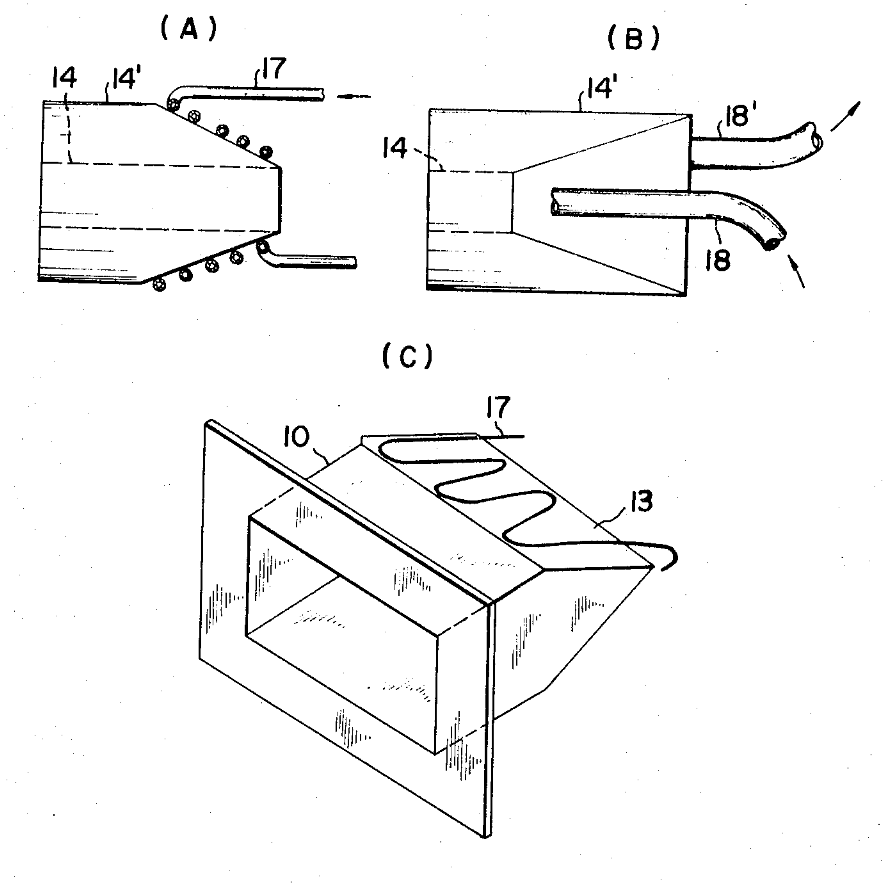

FIGS. 4(A) and 4(B) are perspective views of a wave guide, showing an embodiment of the present invention; and FIGS. 5(A), (B) and (C) as well as FIGS. 6 (A), (B) and (C) are perspective views showing another embodiment of the present invention.

As stated, FIGS. 1(A), (B) and (C) show the conventional prior art matched termination for wave guides and coaxial cables of the simplest structure. The resistance film 2, the specific surface resistance thereof being $$R_s = 377 \times \frac{\lambda g}{\lambda}$$

where $\lambda$ is the excitation wavelength and $\lambda g$ is the guide wavelength, is provided inside the rectangular wave guide 1. When this functions as the matched termination, the resistance film is restricted to the case where the impedance $Zb$ inclusive of the reverse side of the film, hereinafter described as reverse side impedance, is infinite.

However, it is difficult to satisfy the above-mentioned condition over a wide frequency band, and actually, the short circuiting plate 3 is provided at a distance $\lambda g/4$ behind the resistance film 2 and the reverse side impedance $Zb$ is infinite only for the electrical energy wave of the particular wavelength.

Therefore, when the wavelength of said electrical energy is changed, the reverse side impedance $Zb$ is changed and becomes smaller, whereby the matching characteristics are lost.

On the other hand, the matching termination for the coaxial cable shown in FIG. 1(B) has such a structure that the reverse side impedance is closer to infinite, in view of the electromagnetic field.

In other words, the termination of the inner conductor 4' of the coaxial cables consists of resistance film 2, and the end portion 5 of the outer conductor 4 shaped in a frusto-conical form.

According to this embodiment, the reverse side impedance $Zb$ on the reverse side of the resistance film 2 can be represented analytically by the formula given below when the inside is hollow:

$$Zb = \frac{1}{jw\epsilon_0 \cdot a}$$

wherein $w = 2\pi f$, $f$=frequency number, $\epsilon_0$=dielectric coefficient of air, and $a$=radius of the inner conductor.

Therefore, where the radius $a$ of the inner conductor is sufficiently smaller than the wavelength $\lambda$, $Zb$ becomes considerably larger, which, as is readily understood, is very desirable.

Thus, according to the prior art, in the structures mentioned hereinabove, the structure of the inner conductor is a conductor of resistance material, and the adjustment of the resistance value is very complicated in production thereof and, in operation, it has the drawback that cooling is difficult to effect when the conduit is employed with high energy electric power transmission.

In addition, it is necessary to make the outer conductor into a specific form, thus increasing the cost of manufacture.

FIG. 1(C) illustrates an alternative approach of the prior art, wherein the outer conductor comprises a resistance material.

In the drawings, numeral 4 designates the outer conductor; 4' the inner conductor; 2 the resistance film, and 6 is a tooth-type circuit.

In this structure, the reverse side impedance $Zb$ of the resistance conduit 2 is changed along with the frequency which is not the preferred behavior.

In order to prevent this disadvantage, the tooth-type circuit 6 is provided, but the resulting characteristics are not satisfactory and the structure becomes complicated.

Figure 1:
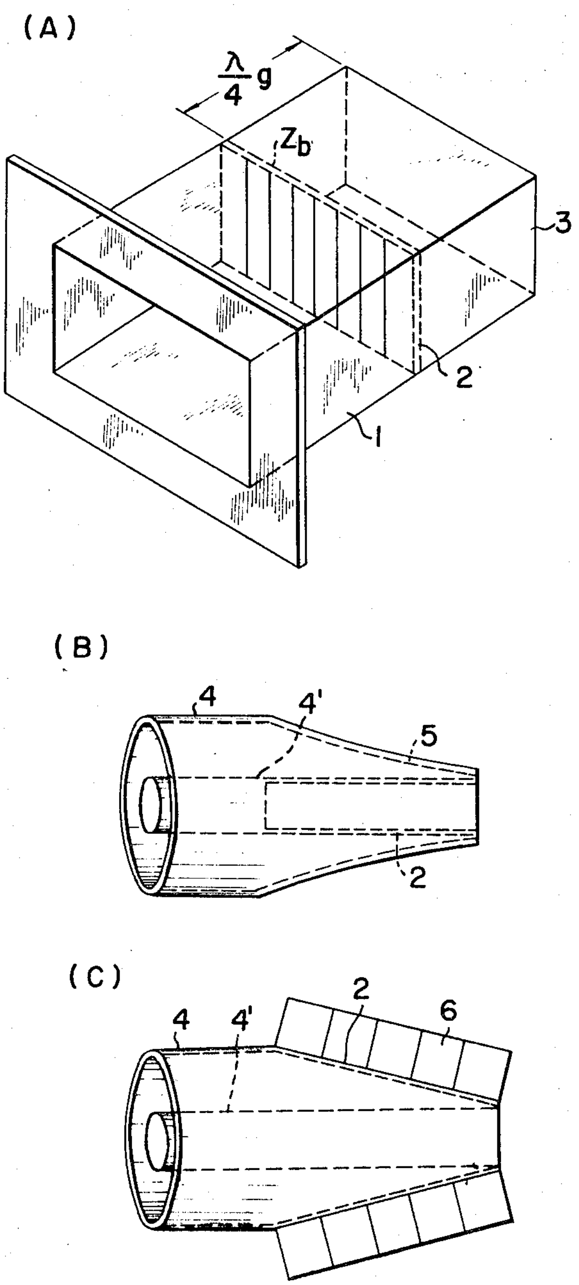

In conclusion, as shown in the embodiment of FIG. 1, it is impossible to ignore the effect of the reverse side impedance in the attenuation elements for high frequency waves in which a resistance film is used. This is the greatest drawback of the operational characteristics of these structures.

The present invention overcomes the above-mentioned disadvantages by providing a resistance film element which has no reverse side impedance effect.

Briefly stated, the principle of the present invention resides in the fact that the specific permeability $\dot{\mu}r = \mu' r - j\mu'' r$ of a magnetic material such as ferrite is $\mu' r \leqq 1$, $\mu'' r \gg 1$ in the higher frequency band than the natural resonant frequency of said material, and the property of $\mu'' r$ is reduced almost in counter proportion to the frequency utilized.

Figures 2, 3:
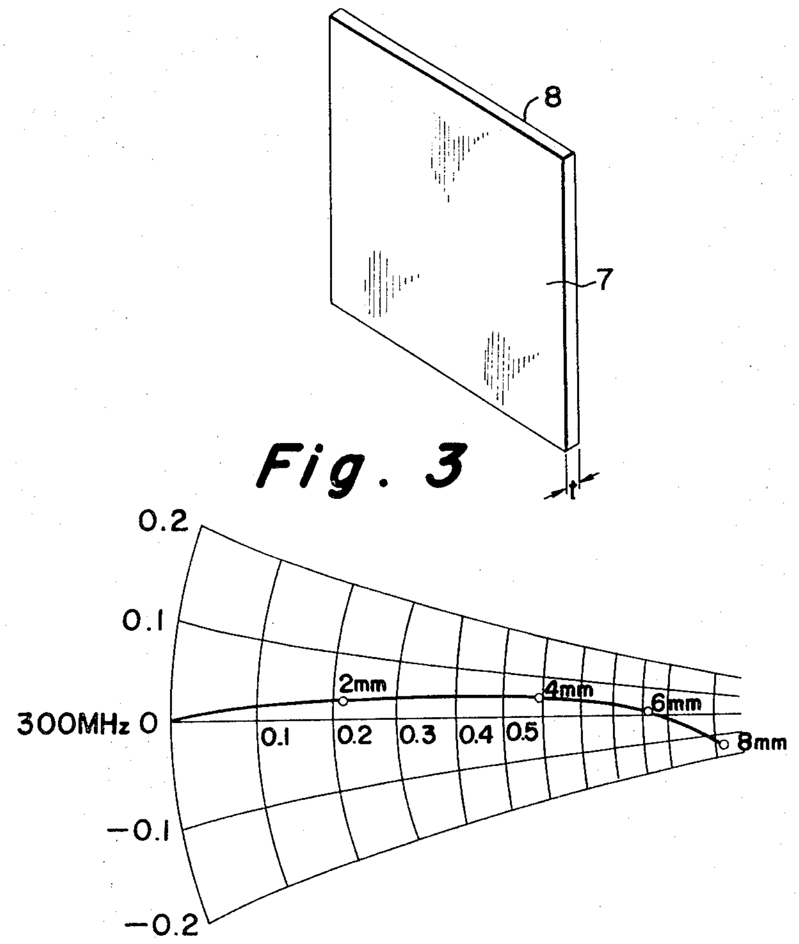
FIG. 2 is a view in perspective of the wave matching element according to the present invention.
FIG. 3 is a chart diagram showing the impedance characteristics of the wave-matching element of the present invention.

In other words, a material having such a property as mentioned above, for example a ferrite plate, is made into a thin plate 7, see FIG. 2, the thickness of which is $t$ and the reverse side thereof is lined with a conductive coating 8, the surface impedance anticipated from the front side becoming the resistance $R_s$, in accordance with the equation $$R_s=2\pi\mu r''\frac{t}{\lambda}$$

Therefore, $R_s$ can assume several values, depending on how $\mu r''$ and $t$ are selected.

FIG. 3 shows the impedance characteristics of ferrite as magnetic resistance film material. It is apparent from the drawing that the surface impedance is changed along with the thickness $t$.

The point 0 in the chart diagram, represents 377 ohm, and $t_1$ and $t_2$ show the resistance values corresponding to the thickness of the plate.

As it is apparent from the above given structure, the conductive coating is adhered to the reverse side of the plate, the reverse side impedance thereof being always zero, i.e. constant, and not changing.

Since the matching element is lined onto the metal plate, it is very readily cooled from the outside. For this reason, it is employed as the matched termination and attenuation element for large-power operations.

FIG. 4(A) shows a rectangular wave guide in which one surface is constructed in such a manner that a slanted or sloping ferrite plate 12 is provided from the upper surface 10 to the lower surface 11. The reverse side of said ferrite plate 12 being lined with the conductive coating 13.

The angle $\theta$ formed between the sloping surface and the lower surface 11 can be determined by the equation $$\mathrm{Sin}\ \theta=\frac{R_s}{R_c}, R_c=\eta_0\frac{\lambda g}{\lambda}$$

wherein $R_s$ is the surface resistance of the magnetic resistance film, R is the specific wave resistance of the wave guide (TE mode), $\eta_0=120\pi$, $\lambda g$ is the guide wavelength, and $\lambda$ is the excitation wavelength.

FIG. 4(B) shows an alternative structure, in which two sloping ferrite plates 12 of equal size are provided respectively from the upper surface 10 and from the lower surface 11, so that when viewed from the side the structure resembles an isosceles triangle. The reverse side of said ferrite plates 12 are lined with a conductive coating 13. The angle between said sloping ferrite plates is designated $2\theta$.

The embodiment shown by FIG. 4(B), is furthermore characterized in that, when compared with the embodiment of FIG. (A), the length of the termination structure in the axial direction is one half that of the embodiment of 4(A).

FIGS. 5(A), (B), and (C) illustrate the construction according to the present invention of the matching load termination structure for coaxial cables. In FIG. 5(A), 14 and 14' are respectively the inner and outer conductors of the coaxial cable; 15 is the ferrite plate; and 16 is the conductive coating lined on the reverse side of the ferrite plate.

In this case, the angle $\theta$ of the sloping surface is selected so as to satisfy the equation $$R_S=\eta_0\ \sin\ \theta$$

where $R_s$, $\eta_0$ and $\theta$ are as defined hereinabove.

FIGS. 6(A), (B), and (C) illustrate another embodiment where the matching load is cooled, and water cooling pipes 17 are connected individually to the conductive coating (see 6A and 6C) or, as it is in the case of 6(B), water is passed through pipes 18 and 18' to cool the conductive coating directly.

While the preferred embodiments of the invention have been hereinabove shown and described, other embodiments and modications thereof will be apparent to those skilled in the art, but are understood to fall within the spirit and scope of this invention as described and claimed.

What we claim as new and desire to secure by Letters Patent of the United States is:

1. A wave guide comprising at least one electrical energy wave matching element disposed within said wave guide in an inclined relationship with respect to the direction of wave propagation therethrough, said matching element being a ferrite plate lined with an electrically conductive coating on the side opposite the side of said ferrite plate opposing the propagation of said electrical energy wave.

2. A wave guide according to claim 1 wherein said wave guide is a co-axial cable and said matching element comprises a frusto-conical shaped member of ferrite material connecting the inner conductor of said coaxial cable to the outer conductor of said cable and the outer surface of said frusto-conical shaped member being lined with a conductive coating.

3. A wave guide according to claim 1 wherein cooling means are disposed adjacent said matching element to thereby cool said matching element during operation.

4. A wave guide according to claim 2 wherein a plurality of conduits are disposed immediately adjacent said conductive coating to allow the passage of cooling fluid therethrough and thereby cool said matching element.

5. A wave guide according to claim 1 wherein said wave guide is a hollow rectangular conduit and said matching element comprises a ferrite plate connecting two opposing walls of said rectangular conduit and forming an acute angle $\theta$ with one of said opposing walls, said plate being lined on the outer surface thereof with a conductive coating.

6. A wave guide according to claim 5 wherein at least one passage is provided in juxtaposition with said conductive coating to allow the passage of cooling fluid therethrough during operation and thereby cool said matching element.

7. A wave guide according to claim 1 wherein said wave guide is a hollow rectangular conduit and said matching element comprises a V-shaped ferrite plate connecting two opposing walls of said rectangular conduit and disposed with the open end of the V-shape facing the interior of said rectangular conduit, the exterior surface of said V-shaped ferrite plate is lined with a conductive coating.

8. A wave guide according to claim 7 wherein at least one passageway is provided in juxtaposition with said conductive coating on the exterior of said V-shaped ferrite plate to allow the passage of cooling fluid therethrough and thereby cool said matching element.

References Cited

UNITED STATES PATENTS 2,870,418 1/1959 Hewitt, Jr. .......... 333—81X

HERMAN KARL SAALBACH, Primary Examiner

M. NUSSBAUM, Assistant Examiner

U.S. Cl. X.R.

333—81